United States Patent Office 3,087,506
Patented Apr. 30, 1963

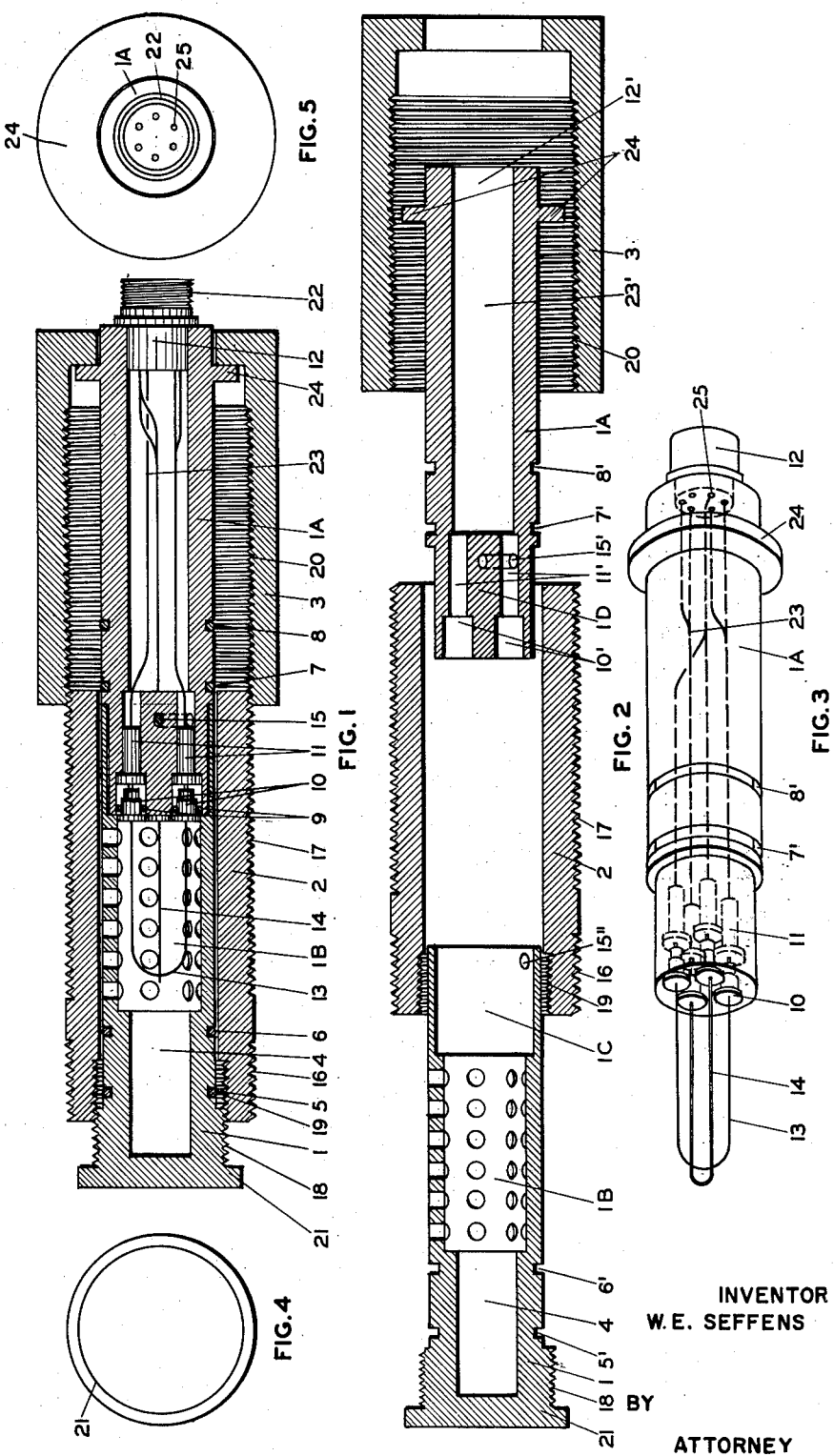

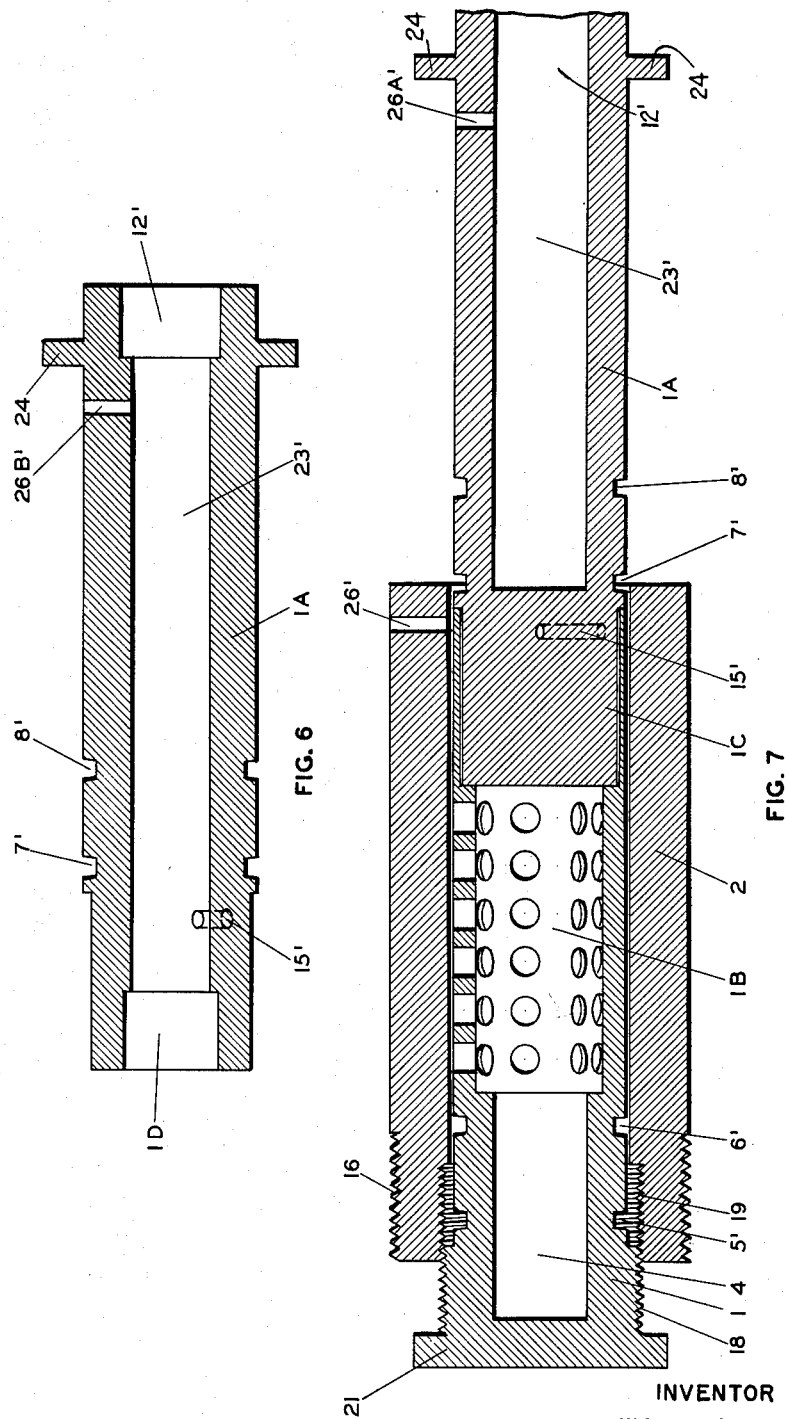

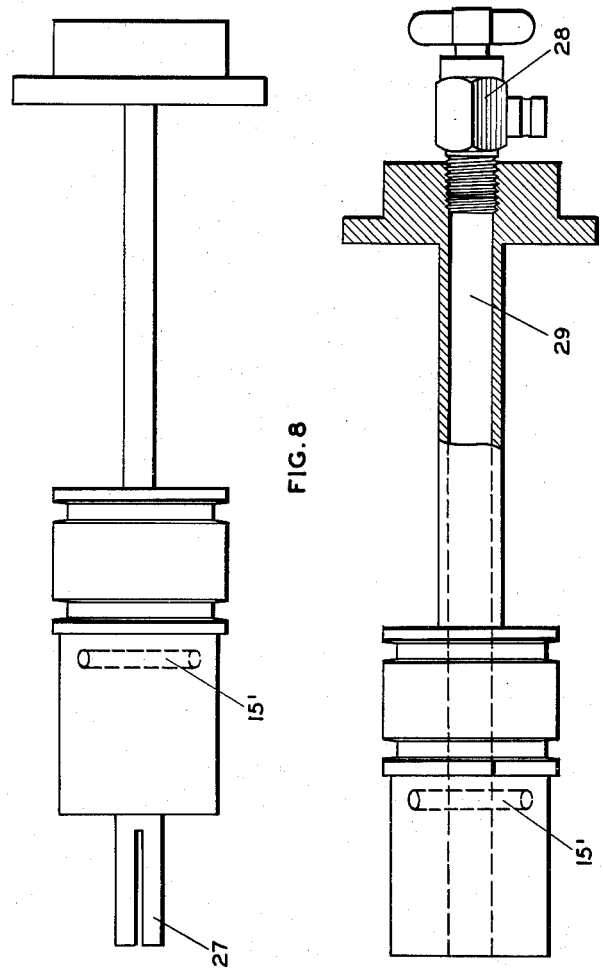

3,087,506
VALVE ADAPTED TO HAVE POSITIONED THEREIN A CORROSION MEASURING PROBE ASSEMBLY
William E. Seffens, Webster Groves, Mo., assignor to Petrolite Corporation, Wilmington, Del., a corporation of Delaware
Filed May 16, 1960, Ser. No. 29,257
2 Claims. (Cl. 137—319)

This invention relates to a device which acts both as a valve and as a means for entering and/or inserting an object, such as a corrosion measuring probe, into a fluid container, for example a vessel or flow line.

When a fluid container, such as a flow line for example, is entered or an object is inserted therein, a shut-off valve is generally positioned between the point of entrance and the flowing fluid, the valve is shut off to allow entrance therein, and the valve is then reopened to renew contact with the flowstream. For example, when one desires to insert a corrosion measuring probe into a flow line, one first installs a shut-off valve before inserting the probe into a flow line.

I have now discovered a device which acts both as a valve and as a means for entering and/or inserting an object, for example a corrosion measuring probe, into a fluid container such as a flow line, which device allows entrance therein without the use of a shut-off valve of the form conventionally used.

The advantages of this invention will become apparent from the description herein given.

The invention is best described by reference to the attached drawing in which:

FIG. 1 is a cross-sectional view of one embodiment of the invention illustrating the individual components of the valve and the corrosion measuring probe.

FIG. 2 is a cross-sectional view of one embodiment of the invention illustrating the individual components of the valve without a corrosion measuring probe.

FIG. 3 is a drawing of the corrosion measuring probe of FIG. 1 in conjunction with the rear section of the sleeve insert.

FIG. 4 is an end view of FIG. 1 indicating a solid round device.

FIG. 5 is the other end view of FIG. 1 also indicating a solid round device and the terminal electrical plug socket.

FIG. 6 is a cross-sectional view of one embodiment of the rear section of the sleeve insert designed to accommodate a corrosion measuring probe.

FIG. 7 is a cross-sectional view of another embodiment of sleeve and sleeve insert where a pin insert is employed instead of the pressure cap.

FIG. 8 is a drawing of a sleeve insert employed to insert an object, such as a corrosion coupon, into the flow line.

FIG. 9 is a drawing containing a partly cross-sectional cut away view of a sleeve insert which is adapted for withdrawing fluid from the flow line.

In FIG. 1, 1 is the front section of the sleeve insert member and 1A is the rear section of the sleeve insert member, both held together by means of pin 15; 1B is the area of the sleeve insert containing slotted openings; 2 is the sleeve member; 3 is a high pressure cap; 4 is a hollow area in the sleeve insert member; 5, 6, 7 and 8 are the sealing means, specifically O-rings which are for example made of rubber or plastic; 9 represents sealing means or O-rings used to seal the probe plug units; 10 represents the plugs attached to the corroding and reference elements 13 and 14; 11 represents the drive fits or jacks adapted for plugs 10; 12 contains the electrical element or terminal plug adapted for connection to the corrosion meter device; 13 and 14 are the corroding and reference elements; 15 is a pin which joins the front section of sleeve insert member 1 to the rear section of sleeve insert member 1A; 16 is a thread adapted for connection with the thread on the vessel or flow line; 17 is a thread adapted for the thread 20 on the high pressure cap 3; 18 is a thread adapted for a thread on inside of sleeve 19; 21 is the front collar on the sleeve insert; 22 is a thread on the terminal electrical plug socket adapted for a suitable connection to the corrosion meter; 23 represents the wires connecting the jacks to the terminal plug socket; 24 is the rear collar of the sleeve insert. The probe shown herein is of the type described in FIGS. 1–4 of patent application 1,328 filed January 8, 1960.

In FIG. 2, the component parts of FIG. 1 are presented wherein 2 is the sleeve element; 1 is the front element and 1A the rear element of the sleeve insert unit adapted for joining by the pin at 15′ and 15″; 1C is the area of the front section of the sleeve insert which is adapted to receive 1D of the rear section of the sleeve insert. The probe and associated parts are represented in FIG. 3. The numbers employed in FIGS. 2 and 3 designate the same parts as those disclosed in FIG. 1. The primed numerals indicate empty sections in which the unprimed numeral designates are placed. For example, 5′, 6′, 7′ and 8′ represent the indented areas in which the O-rings 5, 6, 7 and 8 are placed.

The appropriate parts are designated in FIGS. 4 and 5 with the same numerals employed before. 25 represents the electrical connection of the terminal electrical plug socket.

FIG. 6 represents another embodiment of the rear section of the sleeve insert which is adapted for another type of probe for example that shown in FIG. 9 of patent application 1,328 filed January 8, 1960, which fills the 1D area. 26B′ represents the opening where a pin is inserted to prevent pressure blow-outs in the manner shown in FIG. 7.

FIG. 7 represents another embodiment of the invention wherein the pressure cap is omitted and a pin (not shown) is inserted into 26′ and 26A′ to prevent pressure blow-outs. The corrosion measuring probe is not shown in FIG. 6.

FIG. 8 represents another embodiment of the rear section of the sleeve insert which is adapted for holding an object, such as a corroding coupon, to be inserted into the flow line at position 27. This embodiment including a handle portion fits into the front section of the sleeve insert member acting as a housing in the manner heretofore shown.

FIG. 9 represents another embodiment of this invention by which the device is employed to remove liquid from the flow line. FIG. 9 is a view of the rear section of the sleeve insert adapted for the front section heretofore shown. The fluid exits the flow line through pipe 29 and is removed through faucet 28.

In the apparatus shown the sleeve insert member is made in two sections for convenience only to replace objects contained therein, such as for inserting the corrosion measuring probe therein. It can also be made in a unitary structure.

The following illustrates the operation of the apparatus. The device of my invention has two essential members, one a sleeve member 2 and the other a sleeve insert member 1 and 1A. The sleeve member is attached to the flow line generally by thread 16. The sleeve has an internally threaded section 19 and the sleeve insert has an externally threaded section 18 on the far side opposite the open end of the sleeve insert. These threads may be omitted, if desired. In addition, the sleeve insert has means for sealing against the flow of liquid such as O-rings 5, 6, 7, 8, the O-rings positioned so that, at least one of them impedes the flow of fluid outside of the container. Although a pair of O-rings are shown at each position, one or more O-rings may be employed at each position. When the sleeve insert is fully withdrawn from the flow line, the front collar on the sleeve insert 21 touches the end on the sleeve member and the O-rings 5 and 6 closer to this collar impede the escape of fluid. When the probe is fully inserted in the flow line, the front collar of the insert is in the pipe and the O-rings on the opposite ends 7 and 8 impede the flow of liquid from the pipe. At that point the slotted openings of the sleeve insert 1 and 1A are in the flow of fluid. Both collars 21 and 24 are positioned so as to control the maximum degree of insertion and withdrawal of the sleeve insert.

In addition to the sleeve and sleeve insert, the device may also contain a high pressure cap 3 which aids in inserting the sleeve insert into the sleeve and protects the sleeve insert from being forced out when high pressure is experienced. Alternatively a pin may be employed in place of the high pressure cap such as shown in FIGS. 6, 7, 8, 9 by inserting pins into openings 26B', 26' and 26A', 15' and 15'' respectively. The sleeve insert member acts as the housing for the corrosion measuring probe or other desired objects.

It should be understood that although the sleeve insert contains two sections, front and rear, each section can impede the flow of liquid from the flow line independent of the other, and that they are positioned so as to achieve this effect. For example, if the sleeve insert is withdrawn from the flow line so that only the front section impedes liquid flow, the pin holding the two sections together can be removed from the sleeve insert leaving the front section in place and allowing the removal of the rear sleeve section. Other means besides a pin can be employed to hold the two sections together, for example, set screws, threads, retainer rings, etc.

The valve can be employed in conjunction with known corrosion measuring probes and corrosion measuring systems. The preferred type of probe is described in application S.N. 1,328 filed January 8, 1960, by William E. Steffens and Arthur F. Wirtel and assigned to the same assignee as the present invention. This application is, by reference, incorporated into the present application. It describes, in general, types of corrosion probes and measuring devices employed herein. The O-rings employed herein are fabricated of the same type of material shown therein. Examples of fluid containers include vessels, flow lines such as found with petroleum fluids, for example, oil field products, brines, refinery streams, oil pipe lines, water flooding operations, miscellaneous oil products, natural gas lines, ammonia-ammonium nitrate fertilizer solutions and the like. Thus, the term "fluid" as employed herein includes any fluid material which assumes the shape of its container, for example, liquids, gases and the like.

Having thus described my invention, what I claim as new and desire to obtain by Letters Patent is:

1. A valve adapted to have positioned therein a corrosion measuring probe assembly, comprising, in combination, a hollow sleeve member and a hollow sleeve insert member reciprocally positioned in said hollow sleeve member, said hollow sleeve member having an external circumferential threaded portion and an internal circumferential threaded portion at its forward end, said hollow sleeve insert member being closed at its forward end and having an external circumferential threaded portion at its forward end for engagement with said internal circumferential threaded portion of said hollow sleeve member, said external circumferential threaded portion of said hollow sleeve member being adapted for attachment to the fluid line through which the fluid to be tested passes, first O-ring sealing means positioned in the outer surface of said hollow sleeve insert member adjacent said external circumferential threaded portion thereof for exerting a fluid tight barrier against the inner surface of said hollow sleeve, said hollow sleeve insert member having at least one opening through the wall thereof to the rear of said first O-ring sealing means, and second O-ring sealing means positioned in the outer surface of said hollow sleeve insert member to the rear of said opening for exerting a fluid tight barrier against the inner surface of said hollow sleeve, whereby in opening and closing the valve at least one of said sealing means prevents escape of the fluid tending to escape from between said sleeve member and said sleeve insert member and whereby said external circumferential threaded portion and said sealing means at the forward portion of said hollow sleeve insert member together form a positive seal when said valve is in closed position, said hollow sleeve member and said hollow sleeve insert member being out of threaded engagement and said first O-ring sealing means being out of sealing engagement with said hollow sleeve member when said valve is in open position, whereby fluid communication is established between the fluid line and said hollow sleeve insert member through said opening.

2. The valve of claim 1 including means for protecting the hollow sleeve insert member from blow-out caused by extreme pressure, said means being attached to the rear portion of said hollow sleeve member.

References Cited in the file of this patent

UNITED STATES PATENTS

| | | |
|---|---|---|
| 445,474 | McCarter | Jan. 27, 1891 |
| 1,343,348 | Camporini | June 15, 1920 |
| 2,830,261 | Estelle | Apr. 8, 1958 |
| 2,956,225 | Marsh et al. | Oct. 11, 1960 |
| 2,985,821 | Chiocca | May 23, 1961 |